(No Model.)
F. R. WELTON.
CURTAIN RING.
No. 422,170. Patented Feb. 25, 1890.
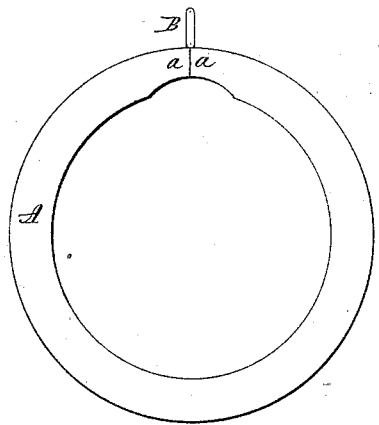
Fig. 1
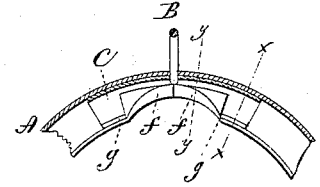
Fig. 2
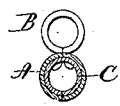
Fig. 5
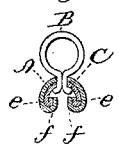
Fig. 6
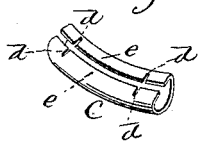
Fig. 3
Fig. 4
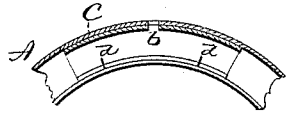
Fig. 7
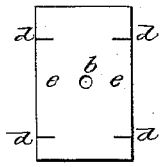
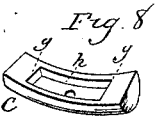
Fig. 8
Witnesses
J. H. Shumway
Lillian D. Kelsey
Frank R. Welton
Inventor
By attys.
Earle H. Seymour
N. PETERS, Photo-Lithographer, Washington, D. C.

UNITED STATES PATENT OFFICE.

FRANK R. WELTON, OF WATERBURY, CONNECTICUT, ASSIGNOR TO THE SCOVILL MANUFACTURING COMPANY, OF SAME PLACE.

CURTAIN-RING.

SPECIFICATION forming part of Letters Patent No. 422,170, dated February 25, 1890.

Application filed December 9, 1889. Serial No. 333,016. (No model.)

*To all whom it may concern:*

Be it known that I, FRANK R. WELTON, of Waterbury, in the county of New Haven and State of Connecticut, have invented a new Improvement in Curtain-Rings; and I do hereby declare the following, when taken in connection with accompanying drawings and the letters of reference marked thereon, to be a full, clear, and exact description of the same, and which said drawings constitute part of this specification, and represent, in—

Figure 1, a side view of the ring complete; Fig. 2, a section in the central plane of the ring through the meeting end portions; Fig. 3, the clip detached; Fig. 4, a blank of sheet metal from which the clip may be made; Fig. 5, a transverse section on line $x\ x$ of Fig. 2; Fig. 6, a transverse section on line $y\ y$ of Fig. 2; Fig. 7, the introduction of the clip preparatory to interlocking the two ends of the ring therewith, and Fig. 8 a modification in the construction of the clip.

This invention relates to an improvement in the construction of that class of rings which are employed on poles across window and door openings, and by which curtains may be suspended, the rings adapted to slide upon the pole, and each ring carrying an eye for the convenient attachment of the curtain. In the more general construction of this class of rings the body of the ring is made from a strip of metal bent longitudinally into tubular shape, so as to bring the two edges together, forming a tube, the tube bent into circular shape to bring the two ends together and form the ring.

The invention relates particularly to the construction for firmly uniting the meeting ends of the tube; and the invention consists in the construction as hereinafter described, and particularly recited in the claim.

A represents the ring, which is of usual form and, as usual, made from a strip of metal bent into tubular shape, and so as to bring the joint upon the inside, and then bent into ring shape, so as to bring the two ends $a\ a$ together. The ring is united by means of a clip C, introduced so as to form a connection between the two ends, and this clip usually carries the eye B. The peculiar clip of this invention for uniting the two ends is represented detached in Fig. 3. It is best made from a blank of sheet metal, as seen in Fig. 4. This blank is pierced at the center, as at $b$, for the introduction of the eye. A short distance from each end and on both sides transverse cuts $d$ are made. The blank is then bent into a semi-tubular shape, as seen in Fig. 3, the edges meeting on the flattened side of the tube and the tube curved corresponding to the curve of the ring, the flat or curved edges being upon the concave side. The size and shape of the clip are such that it may be introduced into the two ends of the ring, as seen in Fig. 7, bringing the flat side upon the inner side, and so that the intermediate portions $e$ of the two edges of the clip will lie at the ends of the ring. Then the inner portion of the ring at each end is turned inward onto the intermediate portions or wings $e$ of the clip, as represented in Fig. 6, $f$ representing the inner turned portions of the ring, and $e$ the wings of the clip. (Also seen in Fig. 2.) The turned-in portion of the ring thus enters the clip between the slits $d\ d$, and so that the end portions of the clip form shoulders, as at $g$, Fig. 2, against which the turned-in portions of the ring will bear, and so as to interlock the two ends of the ring with the clip and firmly secure those ends together. The eye B is introduced through the hole $b$ in the clip either before or after the clip has been applied to the ring—that is, in cases where the eye is desirable. In some cases the eye is omitted. This construction enables the closing or interlocking of the two ends of the ring to be readily produced by machinery, and when the interlocking is properly produced the ends of the ring are united in a firm substantial manner. The wings $e\ e$ of the clip may be turned in before the clip is applied, or the turning in of the wings may be produced at the same time with the turning in of the portions $f$ of the ring.

Instead of making the clip from sheet metal, as I have described, it may be made from cast metal, as represented in Fig. 8, it being cast with a central cavity $h$, and so as to leave the shoulders $g$ at each end to interlock with the ring, it only being essential to the invention that the clip shall be provided with a central cavity and with shoulders at each end, so that the inner surface at the two ends may be struck into such cavity and interlock with said shoulders.

I claim—

In a curtain-ring made from a tube, the ring divided at one point, combined with a clip adapted to set within the meeting ends of the ring, the clip constructed with a central cavity, so as to form shoulders near each end of the clip, the inner surface of the metal of the ring at the two ends struck into said cavity, and so as to interlock with said shoulders of the clip, substantially as described.

FRANK R. WELTON.

Witnesses:
MARK L. SPERRY,
ELLEN M. WELTON.